UNITED STATES PATENT OFFICE.

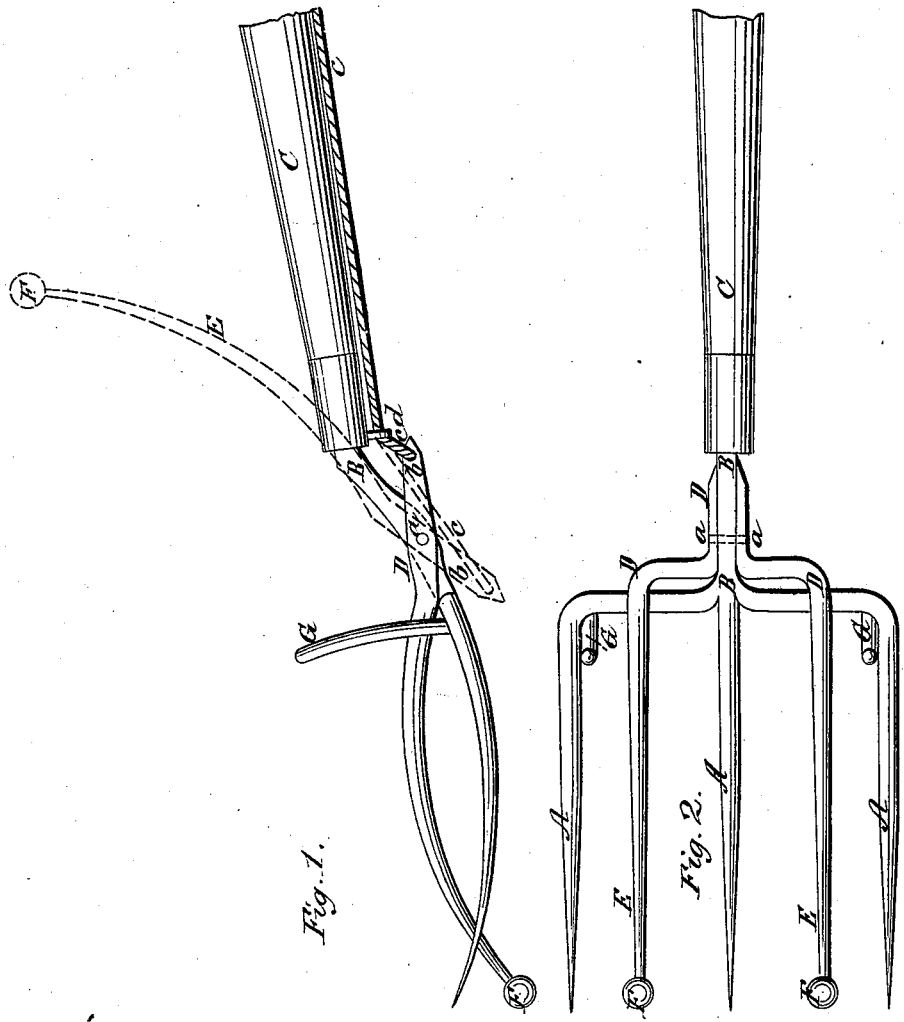

CHARLES L. DRIESSLEIN, OF CHICAGO, ILLINOIS.

IMPROVEMENT IN HAY-FORKS.

Specification forming part of Letters Patent No. 48,665, dated July 11, 1865.

*To all whom it may concern:*

Be it known that I, CHARLES LOUIS DRIESSLEIN, of Chicago, in the county of Cook and State of Illinois, have invented a new and useful Improvement in Forks for Pitching or Loading Grain, Hay, Straw, or other Material; and I do hereby declare the following to be a full, clear, and exact description of the construction and operation of the same, reference being had to the accompanying drawings, making a part of this specification, in which—

Figure 1 represents a side view of the fork, and showing in red lines the position of the swinging fork, shield, or holder when raised up preparatory to the inserting of the fork into the material that is to be pitched, loaded, raised, or handled by it. Fig. 2 represents a top plan of the same, omitting the position shown in red lines in Fig. 1.

Similar letters of reference, where they occur in the separate figures, denote like parts of the fork in both of the drawings.

My invention consists in combining with a rigid fork, that is used either by hand or by horse or other power, a hinged or swinging shield or holder to secure the material upon the tines while it is being loaded, raised, or handled thereby; and it further consists in weighting or overpoising the swinging shield or holder, so that it will more firmly hold the material upon the tines of the principal fork and more readily drop to release it when it is turned over or upside down to release it therefrom; and it further consists in combining with the fork arms or guards to prevent the material on the tines of the principal fork from interfering with the free movement of the swinging fork, shield, or holder.

To enable others skilled in the art to make and use my invention, I will proceed to describe the same with reference to the drawings.

A A A represent tines of any ordinary shape, size, and number, united to a common shank, B, by which they are united to a handle, C; or, instead of a shank, B, (which, however, I prefer,) they may be united to a ferrule or socket, into which the handle may be driven and keyed or wedged or otherwise fastened, as may be preferred. Behind the junction of the several tines, or between their rear portions and the handle, I hinge, as at $a$, a swinging fork, shield, or holder, D, composed of one, two, or more tines or arms, E, that when down upon the principal fork may drop or lie between its tines. The swinging fork has an arm, $b$, projecting beyond its hinged joint, to which a cord, $c$, is attached, said cord passing through one or more dead-eyes, rings, or other guides, $d$, and up to a convenient position, where the operator or user of the fork stands, so as to readily bring down the swinging fork upon the material loaded upon the fork proper by drawing upon the cord $c$. The tines E of the swinging fork or shield D are weighted or overpoised, so that in falling upon the material on the tines A they shall do so with considerable force to pack it, and get a firm hold upon it to keep it there until it is to be discharged at the place of delivery. For this purpose I affix to the ends of the tines E balls or weights F, as being most convenient; but a bar may be used instead, or the overpoise may be in the tines themselves, if so preferred. When the material raised by the fork is to be delivered therefrom the strain upon the cord $c$ is released after the fork is turned upside down, and then the overpoise of the tines E again acts to cause the swinging fork or shield D to drop suddenly and to allow the material to fall from the fork in the proper place of deposit.

To prevent the tines A from entering too far into or under the material that is to be raised, loaded, or handled by the fork, guards G are placed on the tines to define the distance that they may enter the grain, straw, hay, or other material, and to keep such material fairly on the tines, for if the material lay too far back it would prevent the free action of the swinging fork or shield, or stop it from coming down upon the load to properly hold it.

I have described the swinging fork D as having tines only to fall upon and hold the material; but, if so preferred, the space between the tines may be filled with woven wire or meshwork of any kind, or cloth or ribs or braces, all of which are obvious to any mechanic, farmer, or user of such a fork, and it may swing on a roller-head or hinge instead of the pivot $a$.

Having thus fully described my invention, what I claim therein as new is—

1. In combination with an ordinary rigid fork and its handle, a hinged and swinging fork or shield, D, actuated by a cord or rope, substantially as and for the purpose described and represented.

2. Weighting or overpoising the tines or arms of the swinging fork by means of the balls F, or their equivalents, to cause it to fall with more readiness and quickness, as and for the purpose described.

3. In combination with the permanent and swinging forks, the arms G, for preventing the fork from entering the material to be moved by it too far, and thus interfering with the free and unincumbered action of the swinging fork, substantially as herein described.

CHAS. L. DRIESSLEIN.

Witnesses:
FRANKLIN MILLER,
CHARLES NETTLETON.